United States Patent

Bennett

[15] 3,707,096

[45] Dec. 26, 1972

[54] STEERING COLUMN CONSTRUCTION
[72] Inventor: Harry B. Bennett, 17225 Sherwood, Detroit, Mich. 48212
[22] Filed: March 5, 1971
[21] Appl. No.: 121,293

[52] U.S. Cl. .................................... 74/492, 248/221
[51] Int. Cl. ............................................... B62d 1/18
[58] Field of Search ........ 74/492, 493, 490; 248/221, 248/230, 300

[56] References Cited

UNITED STATES PATENTS 2,607,971  8/1952  Bedford, Jr. ..................... 248/300 X
3,140,071  7/1964  Lorentzen ......................... 248/300 X
3,415,140  12/1968  Bien et al. ............................ 74/492

Primary Examiner—Milton Kaufman
Attorney—Barnes, Kisselle, Raisch & Choate

[57] ABSTRACT

A steering column construction comprising a steering column having a column support bracket fixed thereto which has one or more open ended slots into which retainer brackets are slidably received. The retainer brackets are fixed on the vehicle. Portions of the retainer brackets are deformed into the column support bracket to provide a connection between the column support bracket and the retainer brackets which is releasable upon predetermined force on the steering column.

7 Claims, 10 Drawing Figures

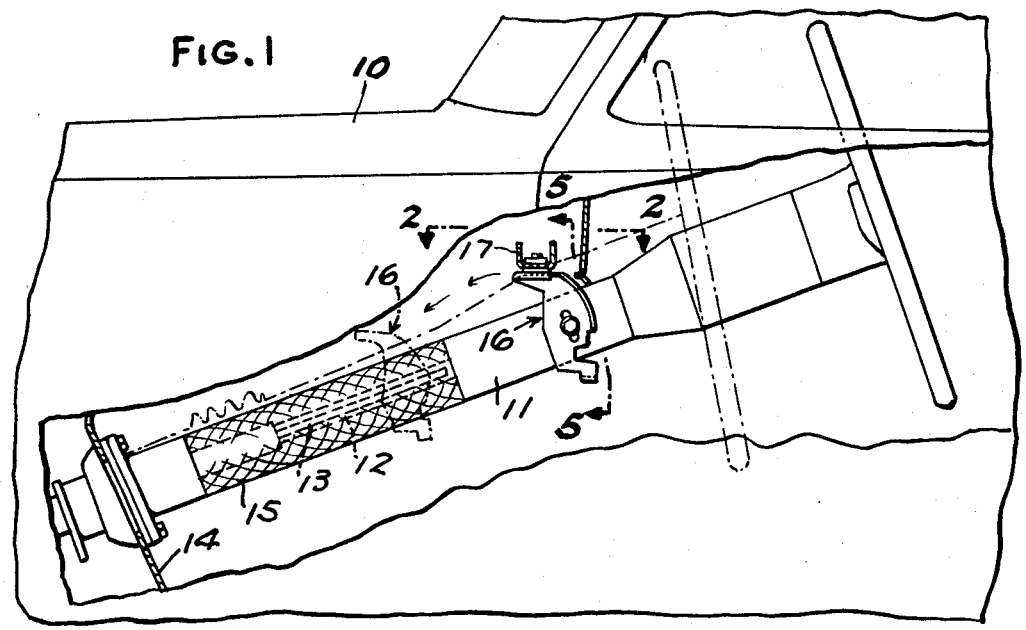
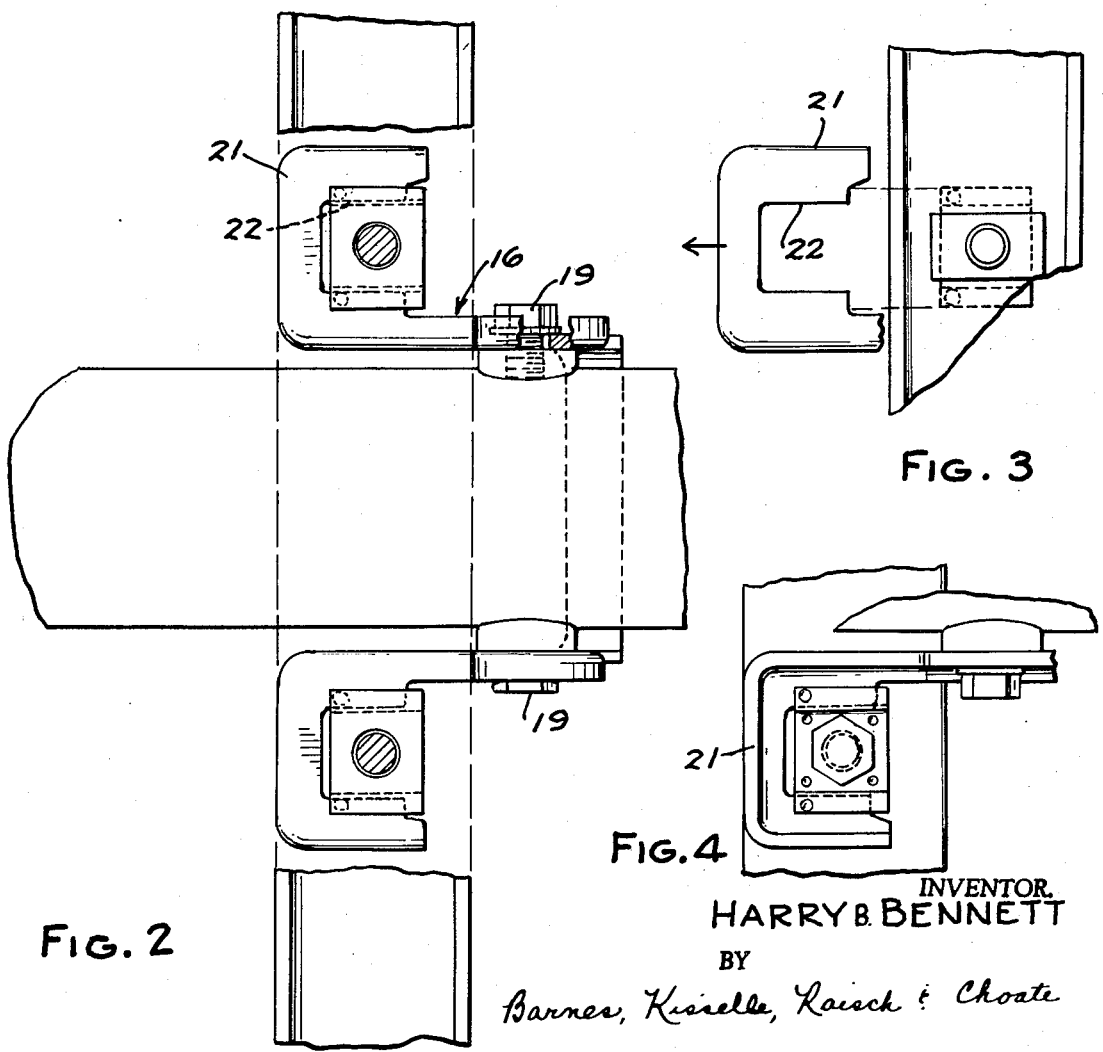

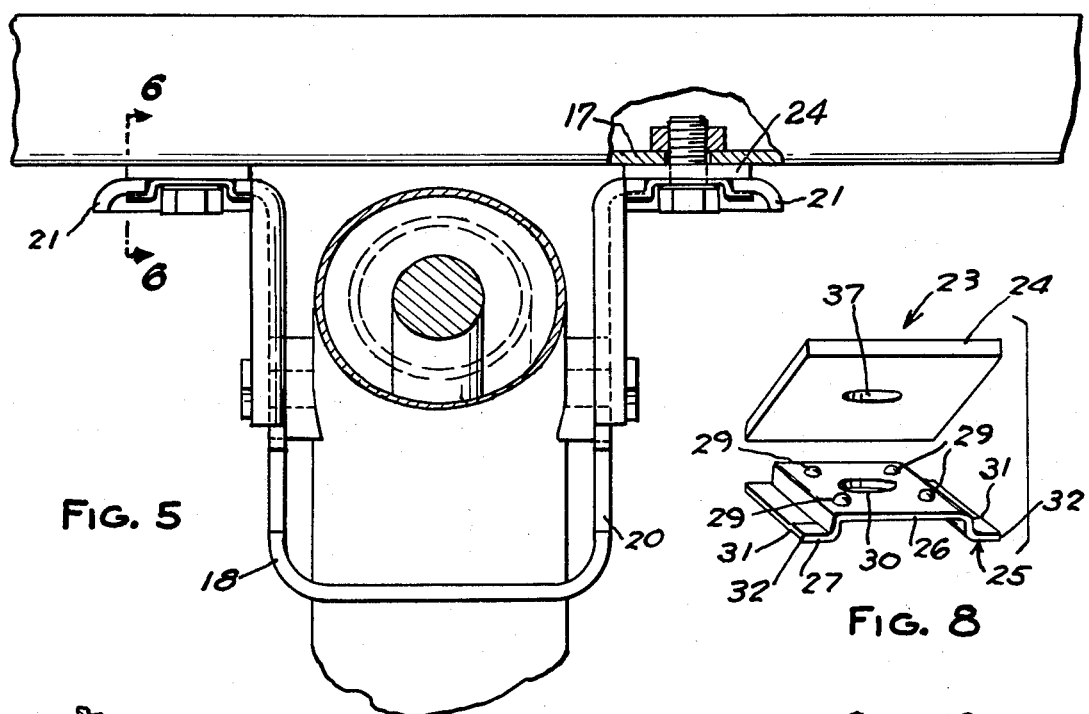
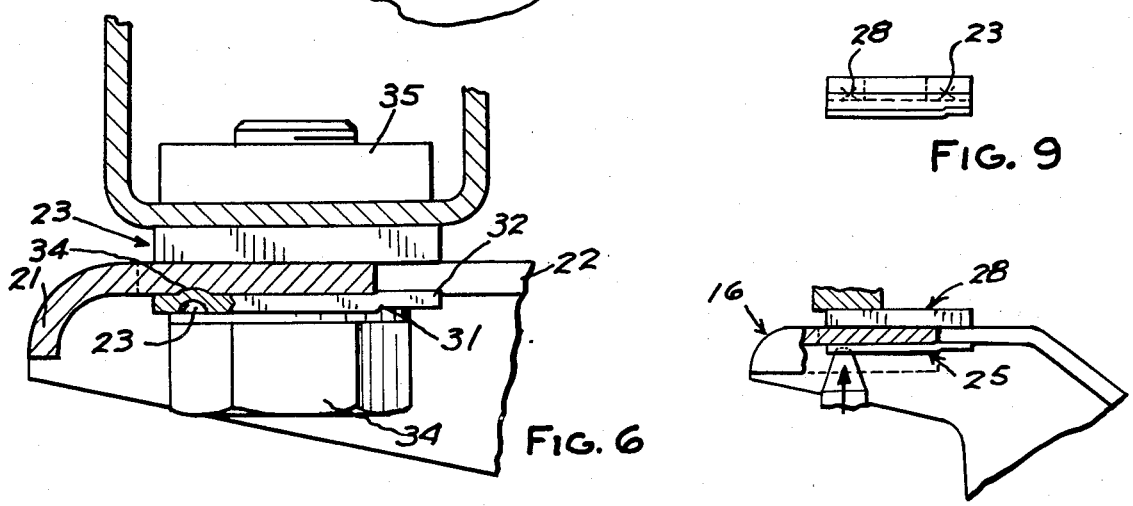
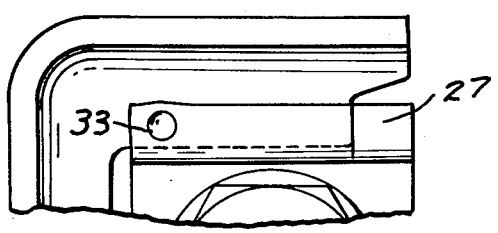

3,707,096

STEERING COLUMN CONSTRUCTION

This invention relates to steering column constructions.

BACKGROUND OF THE INVENTION

In the mounting of steering columns on vehicles it has heretofore been suggested that portions of the steering column by collapsible under predetermined axial force loading on the column for purposes of safety. One method of mounting the steering column has comprised utilizing a column support bracket that is fixed to the steering column and connected to the vehicle through retainer brackets slidably received in slots in the column support. The retainer brackets have included shearable plastic connectors which were adapted to be sheared upon predetermined force to release the retainer brackets that are fixed to the vehicle from the steering column support brackets.

Among the problems with respect to the present constructions are that substantial labor and material are involved in producing the construction including the plastic shearable connectors that are cast in place, the plastic tends to age or shrink resulting in looseness of the connection, and the casting of the plastic in place results in a variable uncontrollable forces so that the forces with which the steering column are held may vary between wide limits.

Among the objects of the invention are to provide a novel steering column construction which is lower in cost and produces a more accurate force with which the steering column is held against axial movement.

SUMMARY OF THE INVENTION

A steering column construction comprising a steering column having a column support bracket fixed thereto which has one or more open ended slots into which retainer brackets are slidably received. The retainer brackets are fixed on the vehicle. Portions of the retainer brackets are deformed into the column support bracket to provide a connection between the column support bracket and the retainer bracket which is releasable upon predetermined force on the steering column.

DESCRIPTION OF THE DRAWINGS

FIG. 1 is a part sectional longitudinal view of a vehicle embodying the invention.

FIG. 2 is a fragmentary sectional view on an enlarged scale taken along the line 2—2 in FIG. 1.

FIG. 3 is a fragmentary exploded view showing the assembly of a portion of the apparatus shown in FIG. 2.

FIG. 4 is a fragmentary bottom plan view of a portion of the structure shown in FIG. 2.

FIG. 5 is a fragmentary sectional view taken along the line 5—5 in FIG. 1.

FIG. 6 is a fragmentary sectional on an enlarged scale taken along the line 6—6 in FIG. 5.

FIG. 7 is a fragmentary bottom plan view of a portion of the construction shown in FIG. 6.

FIG. 8 is an exploded view of a portion of the construction.

FIG. 9 is a side elevational view of a portion of the construction.

FIG. 10 is a part sectional view showing another step in the formation of the construction.

DESCRIPTION

Referring to FIG. 1, the vehicle 10 is shown at comprising a steering column 11 in which a tubular steering shaft 12 is positioned and through which a shifting tube 13 may extend. The lower end of the steering column is mounted on a fire wall 14 in accordance with conventional construction. The steering column 11 includes a collapsible portion 15.

In accordance with the invention, a column support bracket 16 is fixed to the steering column and releasably secured to a transverse portion 17 of the vehicle, as presently described.

The column support bracket 16 includes a steering column encircling portion 18 that is generally U-shaped and is secured to the steering column by bolts 19 extending through slots 20.

The column support bracket 16 further includes spaced flanges 21 each of which has an open ended slot 22 extending rearwardly. A retainer bracket 23 is slidably received in each of the slots 22. Each retainer bracket 23 is made of sheet metal and comprises a first flat member 24 and a second stamping 25 that is generally U-shaped and includes a central base portion 26 and spaced flanges 27. Flat member 24 is made of thicker material than stamping 25. The base 26 is welded to the member 24 by projection welding 28, the sheet metal having been initially provided with projections 29 to facilitate the welding. The resultant bracket 23 has spaced flanges 27 along each edge which frictionally engage the sides of the slot 22.

Portions of the flanges 27 are provided with an offset 31 so that the ends 32 of flanges 27 are spaced closer to the member 24 to prevent rattling of each retainer bracket 23 in its respective slot 22 (FIG. 6).

After each retainer bracket 23 has been inserted into its respective slot 22, portions of flange 27 are deformed inwardly as at 33 by peening as shown in FIG. 10 to also deform portions 34 of the flanges 21 of brackets 16 and thereby secure the bracket 23 to the column support 16. By controlling the peening force, each retainer bracket 23 is secured to the column support with predetermined releasable force.

The final assembly to the automobile is achieved by providing bolts 34 and nuts 35 through the aligned openings 30, 37 to secure the column support bracket 16 to the portion 17 of the vehicle.

Upon predetermined force on the steering column, the steering column is released by overcoming the peening force at the points 33 permitting the retainer brackets 23 to move relative to the vehicle and in turn permitting the steering column to move.

By eliminating the use of plastic, substantial material and labor costs are achieved and, in addition, a more accurate control is provided of the force between the vehicle and the steering column.

I claim:

1. In a vehicle having a steering column, said steering column being mounted on a column support structure and including a collapsible portion, a column support bracket fixed on said steering column and having at least one open ended slot, a retainer bracket having spaced flanges slidably interengaging the sides of said slot, portions of said flanges of said retainer bracket being deformed into said column support bracket to provide a connection between the column support bracket and the retainer bracket which is releasable upon predetermined force on said steering column.

2. The combination set forth in claim 1 wherein said retainer bracket comprises a two piece structure comprising a generally flat member and a second member which has a central portion fixed to said flat member and spaced edge portions deformed therefrom and spaced from said first member to form said spaced flanges.

3. The combination set forth in claim 2 wherein said members are made of sheet metal.

4. The combination set forth in claim 3 wherein said flat member is made of thicker material than said second member.

5. The combination set forth in claim 4 wherein portions of said flanges are spaced a lesser distance from one another in order to prevent rattling of the support bracket.

6. The combination set forth in claim 5 wherein said deformed portions comprise portions of said flanges of said second member.

7. The combination set forth in claim 1 wherein portions of said flanges are spaced a lesser distance from one another in order to prevent rattling of each retainer member in its slot.

* * * * *